(12) United States Patent
Tseng et al.

(10) Patent No.: US 12,525,699 B2
(45) Date of Patent: Jan. 13, 2026

(54) ANTENNA BRACKET AND RELATED NETWORK COMMUNICATION DEVICE

(71) Applicant: Sercomm Corporation, Taipei (TW)

(72) Inventors: Chih Wen Tseng, Taipei (TW); Chia Chun Sun, Taipei (TW)

(73) Assignee: Sercomm Corporation, Taipei (TW)

( * ) Notice: Subject to any disclaimer, the term of this patent is extended or adjusted under 35 U.S.C. 154(b) by 64 days.

(21) Appl. No.: 18/792,563

(22) Filed: Aug. 2, 2024

(65) Prior Publication Data

US 2025/0079684 A1 Mar. 6, 2025

(30) Foreign Application Priority Data

Aug. 31, 2023 (CN) .......................... 202311115968.4

(51) Int. Cl.
*H01Q 1/12* (2006.01)
*H01Q 9/04* (2006.01)

(52) U.S. Cl.
CPC ......... *H01Q 1/1207* (2013.01); *H01Q 9/0407* (2013.01)

(58) Field of Classification Search
None
See application file for complete search history.

(56) References Cited

U.S. PATENT DOCUMENTS

| | | | |
|---|---|---|---|
| 2022/0238982 A1* | 7/2022 | Kim | H01Q 1/1242 |
| 2023/0012739 A1* | 1/2023 | Udagave | H01Q 1/246 |
| 2024/0154292 A1* | 5/2024 | Stelle, IV | H01Q 1/125 |
| 2024/0266711 A1* | 8/2024 | Woolsey | F16M 11/041 |
| 2025/0118894 A1* | 4/2025 | Jun | H01Q 1/246 |
| 2025/0149792 A1* | 5/2025 | Arnold | H01Q 1/287 |
| 2025/0162435 A1* | 5/2025 | Scapin | G05D 1/2297 |

FOREIGN PATENT DOCUMENTS

| | | |
|---|---|---|
| CN | 215266646 | 12/2021 |
| WO | 2016110154 | 7/2016 |
| WO | 2018103478 | 6/2018 |

OTHER PUBLICATIONS

"Search Report of Europe Counterpart Application", issued on Jan. 13, 2025, p. 1-p. 10.

* cited by examiner

*Primary Examiner* — Wilson Lee
(74) *Attorney, Agent, or Firm* — JCIPRNET

(57) ABSTRACT

An antenna module and a related network communication device are provided in this disclosure. A network communication device includes a circuit board, a network communication chip, an antenna, a signal line, and an antenna bracket. The network communication chip is disposed on the circuit board. The antenna bracket has a first antenna slot, a circuit board slot, a circuit board hook and an opposite supporting part. The first antenna slot is configured to carry the antenna. The circuit board hook and the opposite supporting part are respectively located on opposing first surface and second surface of the circuit board. The circuit board slot is located between the circuit board hook and the opposite supporting part to accommodate the circuit board. The circuit board hook is buckled to a first buckle hole of the circuit board.

14 Claims, 11 Drawing Sheets

ANTENNA BRACKET AND RELATED NETWORK COMMUNICATION DEVICE

CROSS-REFERENCE TO RELATED APPLICATION

This application claims the priority benefit of China application serial no. 202311115968.4, filed on Aug. 31, 2023. The entirety of the above-mentioned patent application is hereby incorporated by reference herein and made a part of this specification.

BACKGROUND

Technical Field

The disclosure relates to an antenna bracket and a related network communication device.

Description of Related Art

In recent years, wireless communication technology and the Internet of Things (IOT) have experienced significant growth. An increasing number of electronic devices require network connectivity, thus becoming network communication devices as generally defined. To possess networking capabilities, in addition to requiring network communication chips on the circuit board of network communication devices, antennas used for transmitting and receiving wireless communication signals are also essential components. Moreover, to enhance system performance or communication stability, there is a trend towards increasing the number of antennas.

The size of the circuit board of a network communication device is limited, and it is difficult to directly install multiple antennas on the circuit board. Therefore, in some designs, the antennas are first installed on the antenna bracket, and then the antenna bracket is fixed on the circuit board of the network communication device and connected to the circuit board through signal lines in order to install multiple antennas. The current antenna bracket uses a cylindrical hook. After passing through the opening on the circuit board, two hooks at the end of the cylindrical hook are spread outward to prevent the antenna bracket from detaching from the circuit board. However, in order to allow the two hooks to retract and pass through the opening, there is an assembly gap between the assembled cylindrical hook and the hole wall of the opening, which may easily result in abnormal noise and wobbling. Moreover, in order to provide sufficient structural strength, the opening position must be far away from the edge of the circuit board, occupying a larger space on the circuit board and increasing the difficulty of circuit layout.

SUMMARY

An antenna bracket and a network communication device, which may improve issues related to poor antenna installation, are provided in the disclosure.

According to an embodiment of the disclosure, the antenna bracket is configured to assemble to the circuit board and carry an antenna. The antenna bracket has a first antenna slot, a circuit board slot, a circuit board hook and an opposite supporting part. The first antenna slot is configured to carry the antenna. The antenna bracket is assembled to an edge of the circuit board. The circuit board hook and the opposite supporting part are respectively located on opposing first surface and second surface of the circuit board. The circuit board slot is located between the circuit board hook and the opposite supporting part. The circuit board hook is buckled to a first buckle hole of the circuit board.

According to an embodiment of the disclosure, a network communication device includes a circuit board, a network communication chip, an antenna, a signal line, and an antenna bracket. The network communication chip is disposed on the circuit board. The signal line electrically connects the antenna and the circuit board. The antenna bracket is assembled to an edge of the circuit board. The antenna bracket has a first antenna slot, a circuit board slot, a circuit board hook and an opposite supporting part. The first antenna slot is configured to carry the antenna. The circuit board hook and the opposite supporting part are respectively located on opposing first surface and second surface of the circuit board. The circuit board slot is located between the circuit board hook and the opposite supporting part to accommodate the circuit board. The circuit board hook is buckled to a first buckle hole of the circuit board.

In an embodiment according to the disclosure, in response to the first antenna slot carrying the antenna, the antenna in the first antenna slot is perpendicular to the circuit board.

In an embodiment according to the disclosure, the antenna bracket further has a second antenna slot. The second antenna slot is configured to carry the antenna. In response to the second antenna slot carrying the antenna, the antenna in the second antenna slot is parallel to the circuit board.

In an embodiment according to the disclosure, the antenna in the first antenna slot is parallel to the circuit board.

In an embodiment according to the disclosure, the antenna is placed into the first antenna slot along a first direction. The antenna has a first limiting structure. The first antenna slot has a second limiting structure. The first limiting structure is combined with the second limiting structure to limit movement of the antenna in the first antenna slot in a second direction. The first direction is perpendicular to the second direction.

In an embodiment according to the disclosure, the antenna bracket further has a cable management part. A portion of the signal line is located in the cable management part.

In an embodiment according to the disclosure, the first antenna slot has an antenna hook that is buckled to a second buckle hole of the antenna.

Based on the above, in the antenna bracket and network communication device of the disclosure, the circuit board hook and the opposite supporting part jointly clamp the circuit board, minimizing wobbling and occupying a smaller layout space on the circuit board.

DETAILED DESCRIPTION OF DISCLOSED EMBODIMENTS

Figure 1:
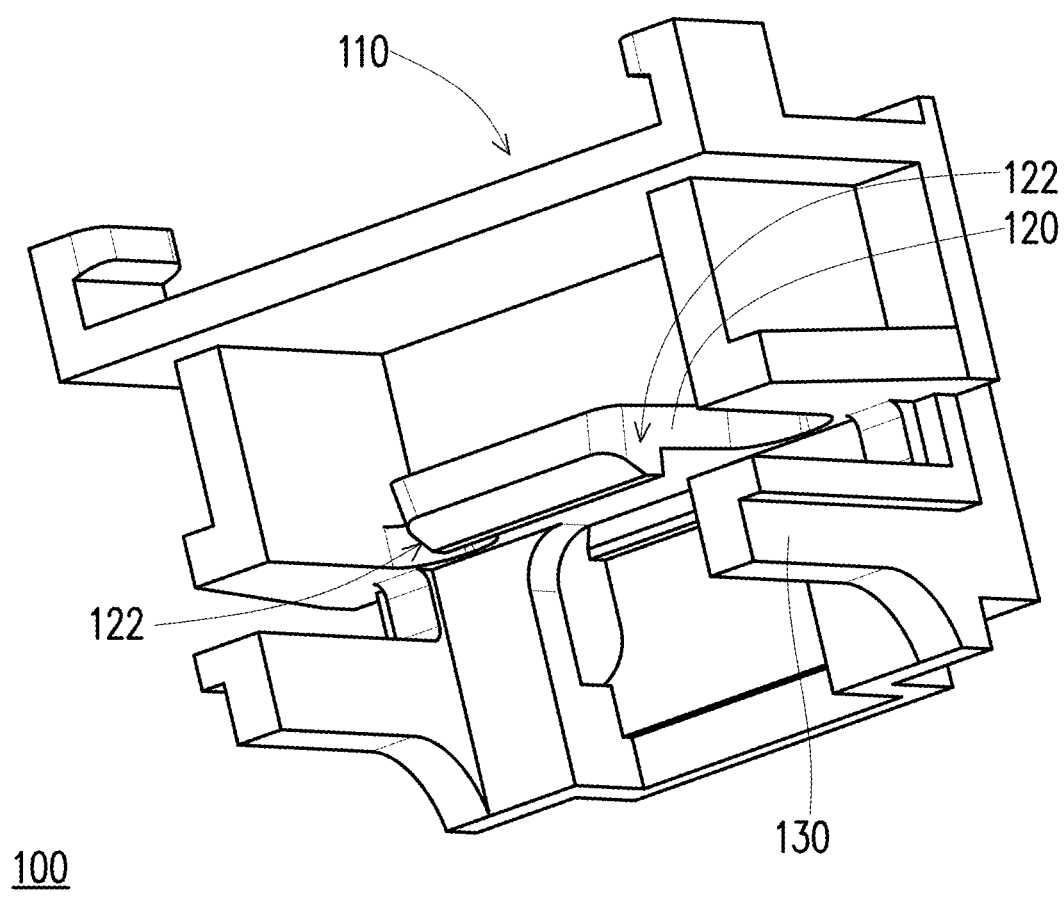
FIG. 1 is a schematic diagram of an antenna bracket of an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

The network communication device in each embodiment of the disclosure is, for example, a multi-band WiFi home gateway, a WiFi 7 wireless access point, an EZmesh-based wireless relay, a WiFi6-based tri-band 10GEPON router, a home gateway or mesh wireless relay supporting smart speaker, a wireless access point using 6 GHz unlicensed frequency band, an XGS-PON home gateway supporting 4*4 11ax WiFi, a tri-band high-end XGS-PON home access gateway supporting 6 GHz, a tri-band pocket-sized mesh wireless relay supporting WiFi6, a WiFi6 router supporting intelligent voice conversation, or a hybrid set-top box supporting AVI decoding and 11ax WiFi, but the disclosure is not limited thereto.

Figure 2:
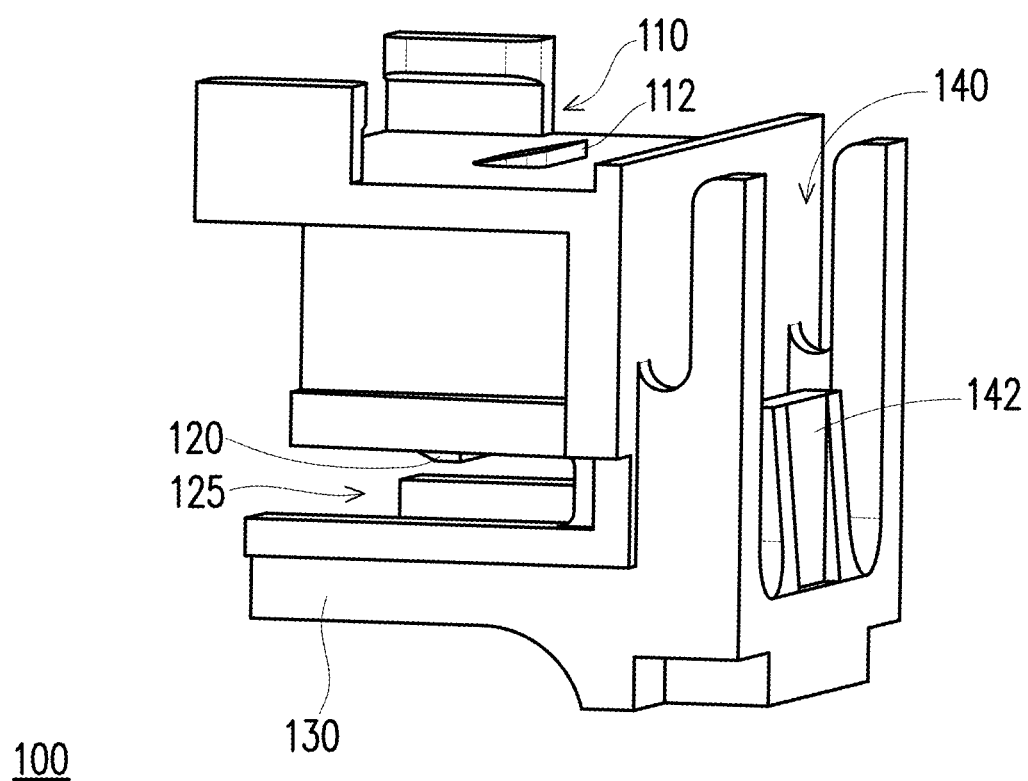
FIG. 2 is a schematic diagram of the antenna bracket in FIG. 1 from another viewing angle.
Figure 3:
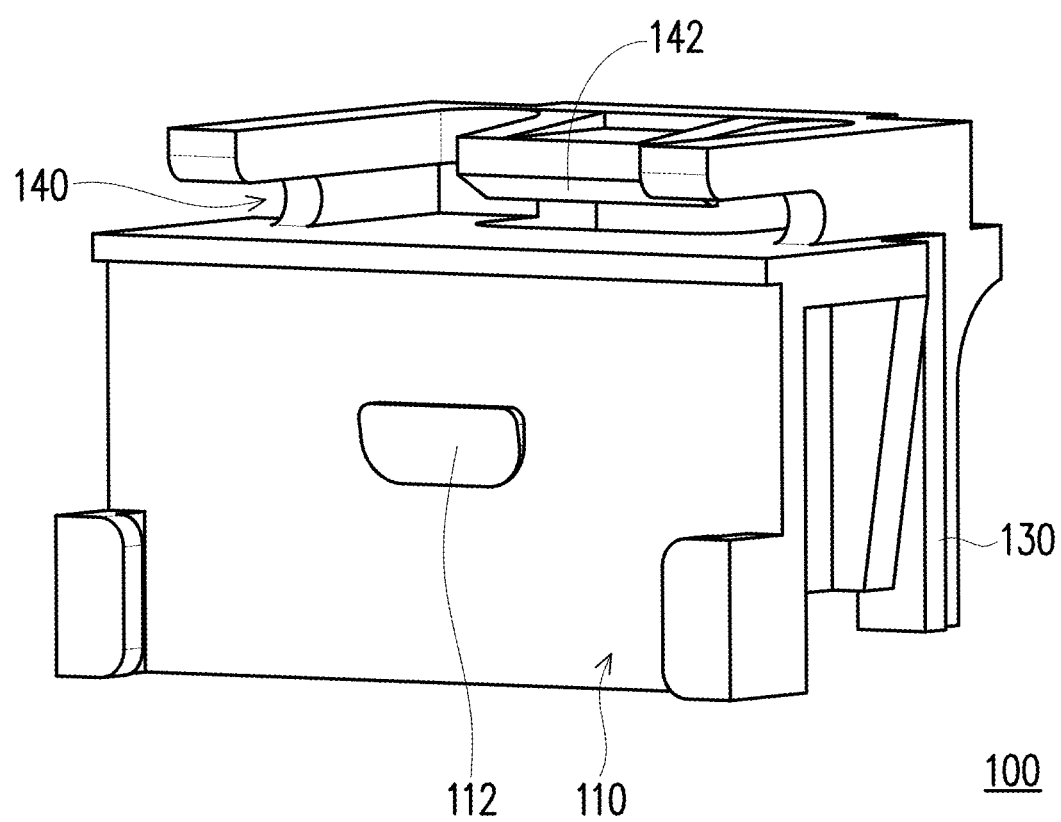
FIG. 3 is a schematic diagram of the antenna bracket in FIG. 1 from another viewing angle.

FIG. 1, FIG. 2, and FIG. 3 are respectively schematic diagrams of an antenna bracket from different viewing angles according to an embodiment of the disclosure. Referring to FIG. 1, the antenna bracket 100 of this embodiment has a first antenna slot 110, a first antenna hook 112, a circuit board hook 120, a circuit board slot 125, an opposite supporting part 130, a second antenna plug slot 140 and a second antenna hook 142. In this embodiment, the entire antenna bracket 100 is integrally formed, which results in lower manufacturing costs and better structural strength. However, the disclosure is not limited thereto. The antenna bracket 100 may also be assembled from multiple components. The material of the antenna bracket 100 may be plastic or other suitable materials.

The first antenna slot 110 and the first antenna hook 112 are configured to assemble the first antenna, and the second antenna slot 140 and the second antenna hook 142 are configured to assemble the second antenna. The antenna bracket 100 may be installed with an antenna only in one of the two antenna slots 110 and 140, or may be installed with antennas in both the antenna slots 110 and 140. The circuit board slot 125 is located between the circuit board hook 120 and the opposite supporting part 130 to accommodate the circuit board and assemble the antenna bracket 100 on the circuit board in cooperation with the circuit board hook 120 and the opposite supporting part 130. In another embodiment, the antenna bracket 100 may also have only one of the two antenna slots 110 and 140.

Figure 4:
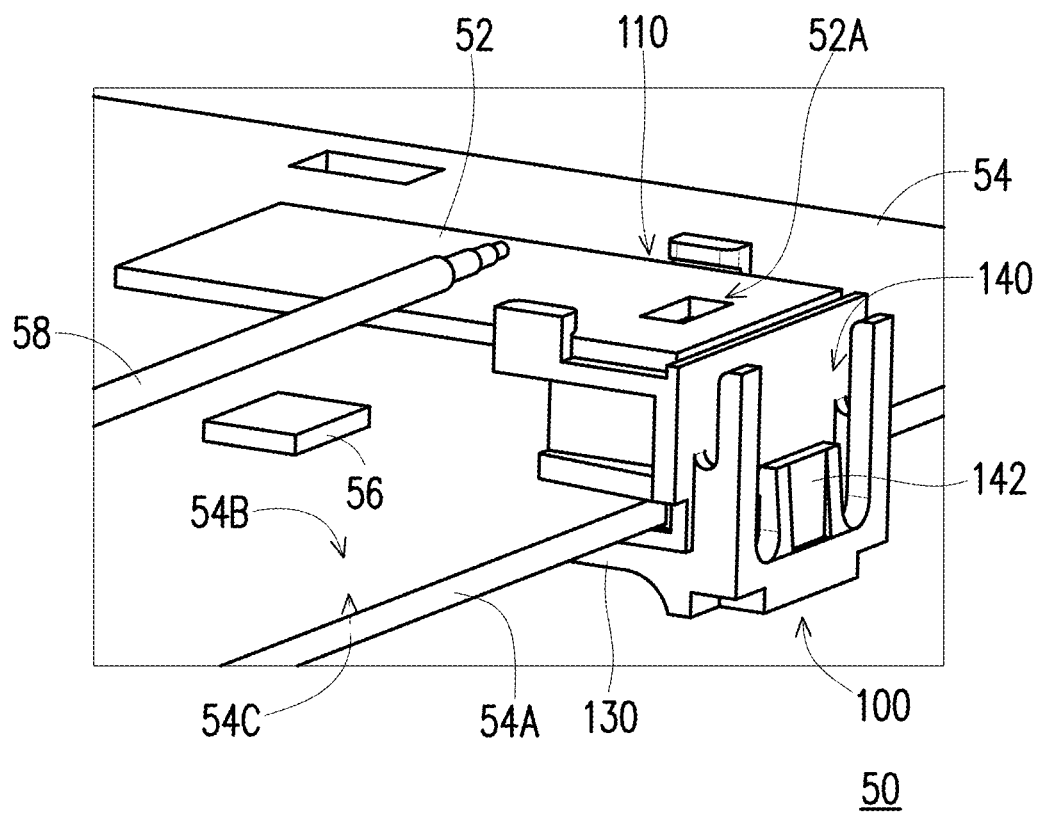
FIG. 4 is a schematic diagram of a network communication device using the antenna bracket of FIG. 1 of an embodiment of the disclosure.
Figure 5:
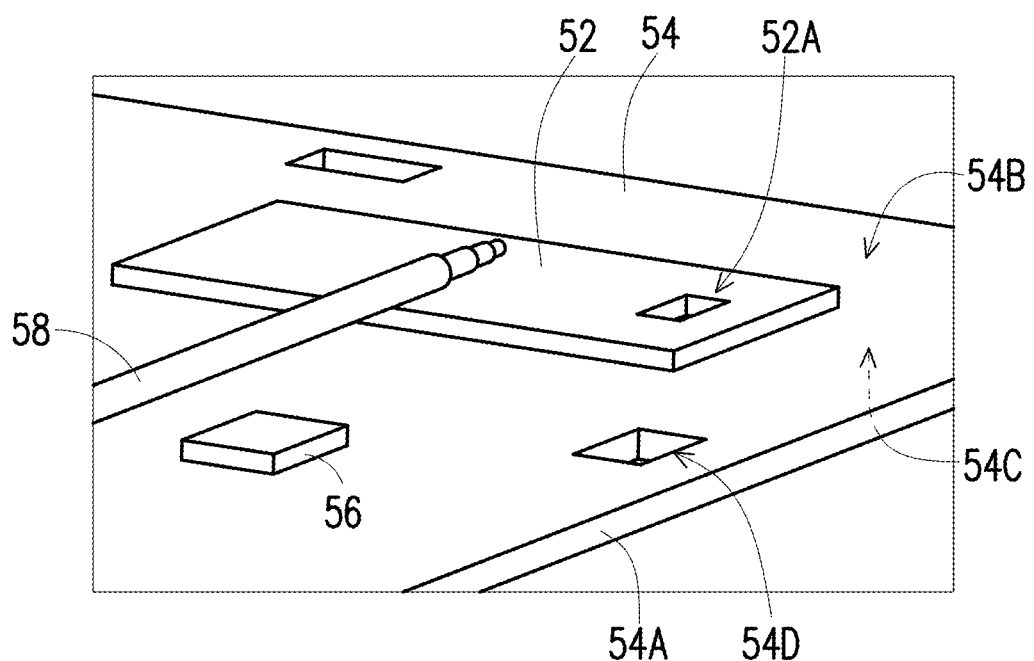
FIG. 5 is a schematic diagram of the network communication device in FIG. 4 with the antenna bracket removed.

FIG. 4 is a schematic diagram of a network communication device using the antenna bracket of FIG. 1 of an embodiment of the disclosure, FIG. 5 is a schematic diagram of the network communication device 50 in FIG. 4 with the antenna bracket 100 removed. Although the appearance members and other components of the network communication device 50 are not shown in FIG. 4 and FIG. 5, the network communication device of the disclosure may be configured with various forms of appearance members and other components according to requirements, so no further description is given here. Referring to FIG. 1 to FIG. 5, the network communication device 50 of this embodiment includes a circuit board 54, a network communication chip 56, an antenna 52, a signal line 58, and an antenna bracket 100. The network communication chip 56 is disposed on the circuit board 54. The network communication chip 56 is, for example, a radio frequency (RF) chip, a transceiver chip, a baseband chip, and a network communication system on a chip. The antenna 52 may be implemented in a suitable manner such as a patch antenna. For example, a patch antenna with metal lines or patterns (not shown in the drawings) is disposed on a circuit board or other suitable carrier plate to send and receive signals at the appropriate frequency. The signal line 58 electrically connects the antenna 52 and the circuit board 54, and the circuit board 54 has metal conductive wires that may electrically connect the signal line 58 and the network communication chip 56. In other words, the antenna 52 is electrically connected to the network communication chip 56 through the signal line 58 and the circuit board 54, enabling the network communication chip 56 to send and receive wireless signals through the antenna 52 for communication.

The antenna bracket 100 is assembled to the edge 54A of the circuit board 54 in a direction parallel to the surface of the circuit board 54. When the circuit board 54 is inserted into the circuit board slot 125, the circuit board slot 125 accommodates the circuit board 54. The circuit board hook 120 and the opposite supporting part 130 are respectively located on the opposing first surface 54B and the second surface 54C of the circuit board 54. The circuit board hook 120 is buckled to the first buckle hole 54D of the circuit board 54, and the opposite supporting part 130 is abutted against the second surface 54C of the circuit board 54. In this embodiment, when viewed from the extending direction of the circuit board hook 120, the two sides 122 of the hook of the front end of the circuit board hook 120 may be inclined surfaces. When the circuit board hook 120 is buckled to the first buckle hole 54D of the circuit board 54, as the depth of the hook of the front end of the circuit board hook 120 buckled into the first buckle hole 54D increases, the two sides 122 of the circuit board hook 120 more closely contact the hole wall of the first buckle hole 54D. Therefore, this fixing method may not be affected by the manufacturing size error of the circuit board hook 120 and the first buckle hole 54D, so that the antenna bracket 100 may be stably assembled to the circuit board 54. Therefore, when the circuit board 54 is inserted into the circuit board slot 125, the circuit board 54 is firmly clamped between the circuit board hook 120 and the opposite supporting part 130, so that the antenna 52 may provide stable signal reception capabilities.

In this embodiment, the antenna 52 further has a second buckle hole 52A. When the antenna 52 is inserted into the antenna slot 110 in a direction parallel to the surface of the antenna 52, the antenna hook 112 is buckled to the second buckle hole 52A of the antenna 52 to prevent the antenna 52 from detaching from the antenna slot 110.

In the network communication device 50 of this embodiment, the antenna bracket 100 is assembled to the circuit board 54, so the relative positions of the two are fixed. The antenna 52 is slotted into the antenna slot 110, so the relative positions of the two are fixed. In other words, the relative positions of the antenna 52 and the circuit board 54 are fixed. Therefore, during the process of installing the circuit board 54 in a housing, there is no need to consider whether the connection between the antenna 52 and the circuit board 54 is affected. The overall assembly is easy and quick, and the signal line 58 is not easily dislodged by pulling forces. Compared with disposing the antenna on the housing, the length of the signal line 58 in this embodiment may also be reduced. Furthermore, as the position and angle of the antenna 52 relative to the circuit board 54 may be arranged and tested in advance, the antenna 52 may be easily fixed at the optimal position and angle relative to the circuit board 54 by designing an appropriate antenna bracket 100. This in turn reduces the time required for testing and adjustments, thereby lowering production costs. In the network communication device 50 of this embodiment, the antenna bracket 100 is assembled on the edge 54A of the circuit board 54 and may be far away from other components on the circuit board 54. In addition, the antenna bracket 100 is detachably assembled to the circuit board 54, and the antenna 52 is detachably slotted into the antenna slot 110. Therefore, when the type, size, and installation position of the antenna 52 are required to be changed according to different designs, such changes may be easily implemented without incurring significant costs.

In addition, during the process of assembling the antenna bracket 100 to the circuit board 54, the circuit board hook 120 elastically deforms in a direction away from the first surface 54B of the circuit board 54 and then buckles into the first buckle hole 54D. When designing the dimensions of the first buckle hole 54D, it is not necessary to reserve additional space for deformation of the circuit board hook 120. Therefore, the size of the first buckle hole 54D may be minimized. In addition, compared with the opening used in cooperation with the cylindrical hook in the prior art, since the size of the first buckle hole 54D may be reduced, the distance between the first buckle hole 54D and the edge 54A of the circuit board 54 in this embodiment may be correspondingly shorter without affecting the structural strength. Therefore, the layout area occupied by the circuit board 54 may be reduced, which facilitates in reducing the overall size of the network communication device 50. For example, the distance between the opening used in cooperation with the cylindrical hook and the edge of the circuit board in the prior art is 10 mm. However, in this embodiment, the distance between the first buckle hole 54D and the edge 54A of the circuit board 54 only needs to be 5 mm.

Since the antenna bracket 100 is assembled to the circuit board 54 in a direction parallel to the surface of the circuit board 54 instead of perpendicular to the surface of the circuit board 54 as in the prior art, it may effectively reduce the likelihood of damaging the circuit board 54 due to improper force application during assembly. In addition, the antenna 52 is also assembled into the antenna slots 110 and 140 of the antenna bracket 100 in a direction parallel to the surface of the antenna 52, which may also effectively reduce the likelihood of damaging the antenna 52 due to improper force application during assembly. In addition, the contact area of the first antenna hook 112, the circuit board hook 120, and the circuit board slot 125 of the antenna bracket 100 when assembled to the circuit board 54 is larger than the contact area of the cylindrical hook in the prior art, which facilitates in achieving the effect of stabilizing the antenna bracket 100 and the antenna 52.

Figure 6:
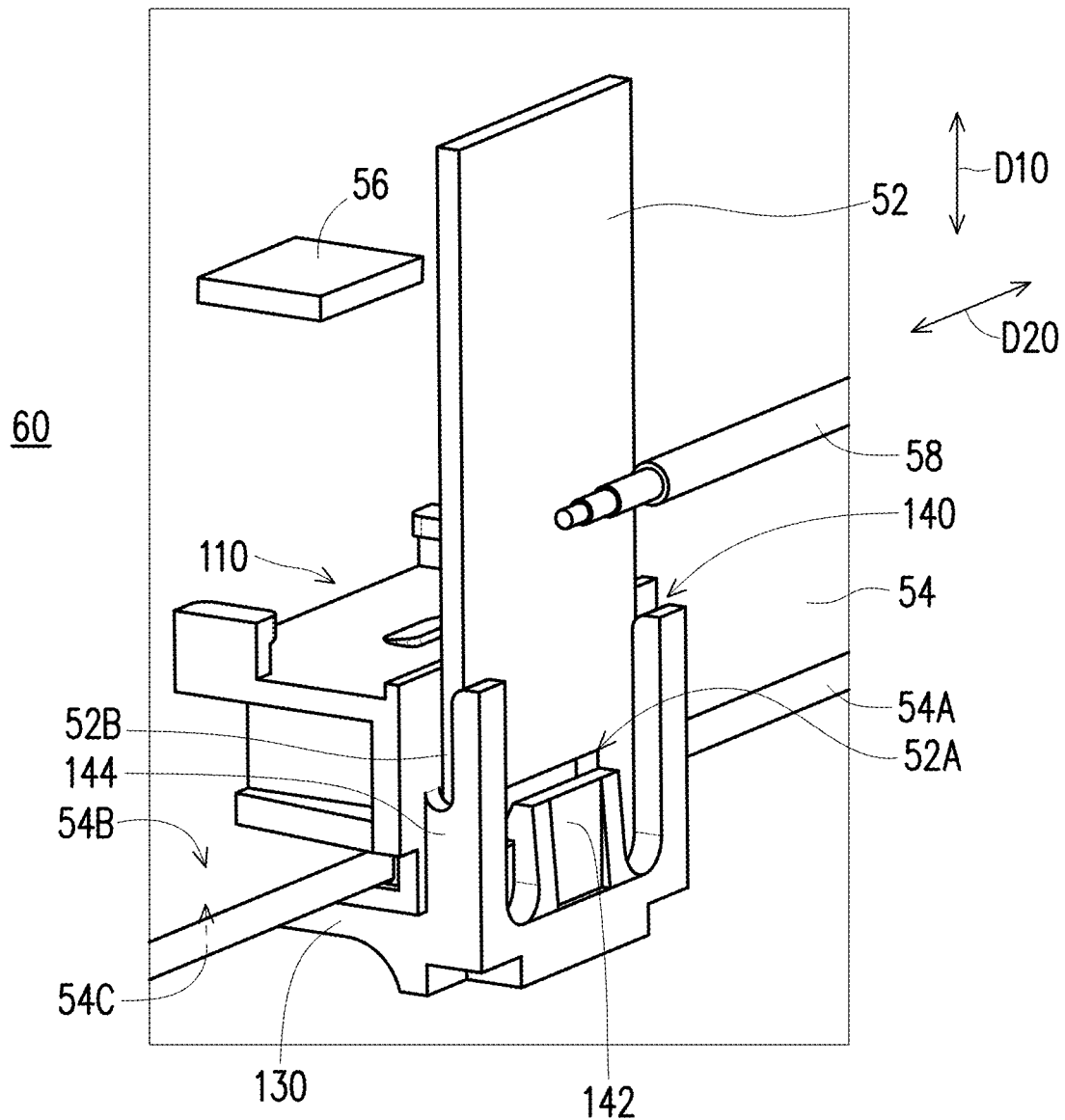
FIG. 6 is a schematic diagram of a network communication device of another embodiment of the disclosure.

In the embodiment of FIG. 4, the antenna 52 inserted into the antenna slot 110 is substantially parallel to the circuit board 54. FIG. 6 is a schematic diagram of a network communication device of another embodiment of the disclosure. The network communication device 60 in the embodiment of FIG. 6 is substantially the same as the network communication device 50 in the embodiment of FIG. 4, and includes substantially the same components. The main difference is that the antenna 52 in the embodiment of FIG. 6 is carried in the second antenna slot 140 so that the antenna 52 inserted into the antenna slot 140 is substantially perpendicular to the circuit board 54. When the antenna 52 is inserted into the antenna slot 140 in a direction parallel to the surface of the antenna 52, the antenna hook 142 is buckled to the second buckle hole 52A of the antenna 52 to prevent the antenna 52 from detaching from the antenna slot 140.

Referring to FIG. 4 to FIG. 6, the antenna brackets 100 of the network communication devices of the two embodiments are the same. Due to the antenna bracket 100 having the antenna slot 110 and the antenna slot 140, it is possible to select whether to carry the antenna 52 in the antenna slot 110 or the antenna slot 140 according to specific requirements. This allows for different antenna directivity to be achieved, thereby enhancing communication performance. Therefore, two antennas 52 may also be respectively installed in the antenna slot 110 and the antenna slot 140 at the same time, which may save the space occupied by multiple antennas while still ensuring communication performance.

In the embodiment of FIG. 6, the antenna 52 is placed into the antenna slot 140 along the first direction D10. The antenna 52 has a first limiting structure 52B. The antenna slot 140 has a second limiting structure 144. The first limiting structure 52B is combined with the second limiting structure 144 to limit the movement of the antenna 52 in the antenna slot 140 in the second direction D20. The first direction D10 is perpendicular to the second direction D20. Therefore, the second limiting structure 144 may prevent the antenna 52 from sliding out of the antenna slot 140 laterally. In this embodiment, the first limiting structure 52B is a side of the antenna 52 adjacent to the second limiting structure 144. The second limiting structure 144 is a rib that may block the movement of the antenna 52 in the second direction D20. When the antenna 52 is placed into the antenna slot 140 along the first direction D10, the side of the antenna 52 serving as the first limiting structure 52B rests against the second limiting structure 144.

Figure 7:
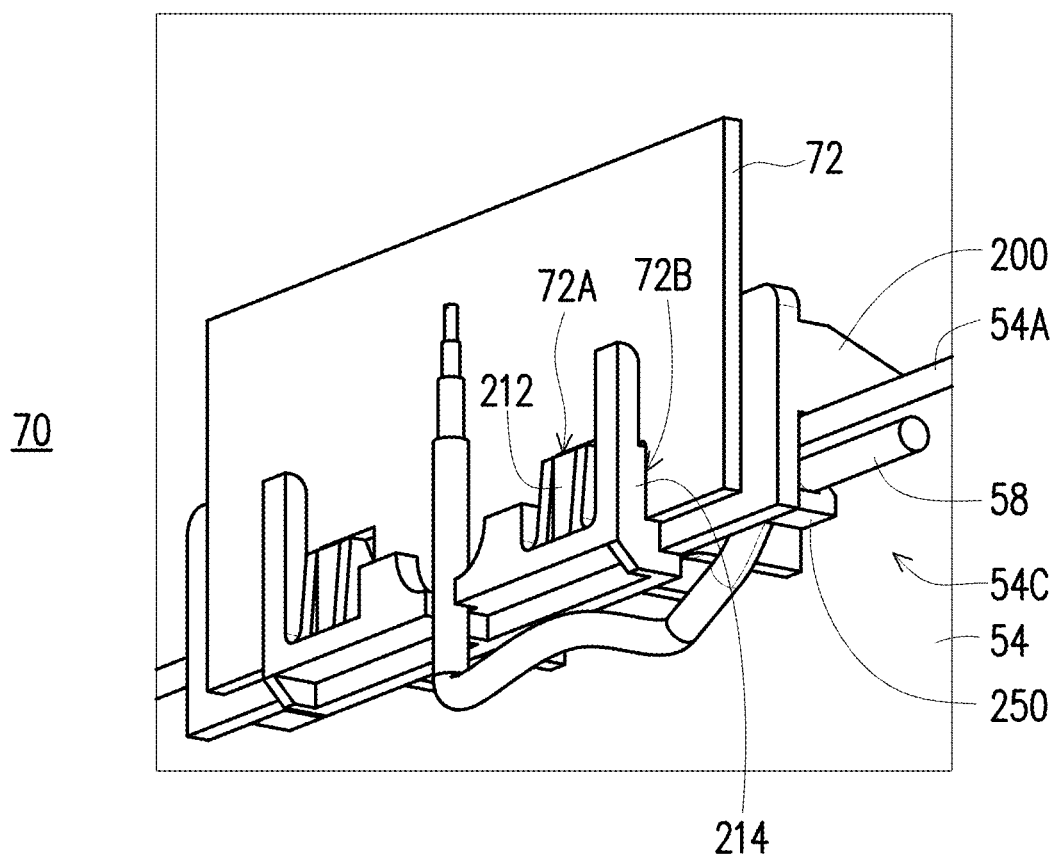
FIG. 7 is a schematic diagram of a network communication device of yet another embodiment of the disclosure.
Figure 8:
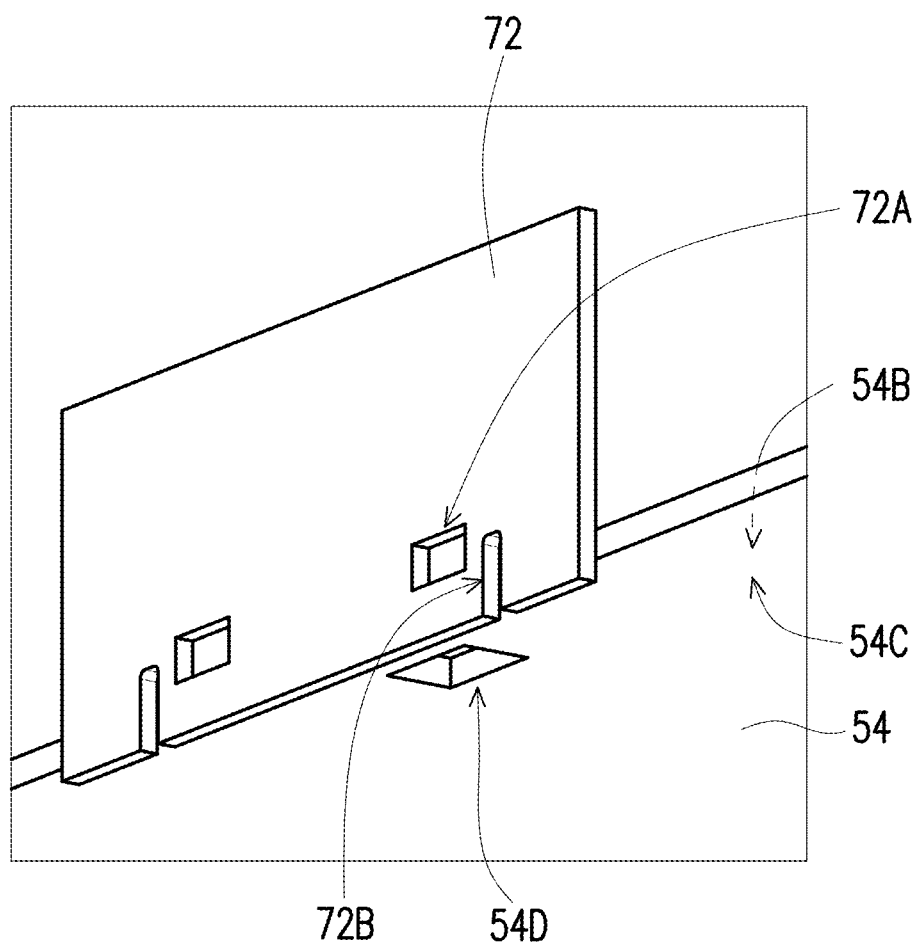
FIG. 8 is a schematic diagram of the network communication device in FIG. 7 with the antenna bracket removed.
Figure 9:
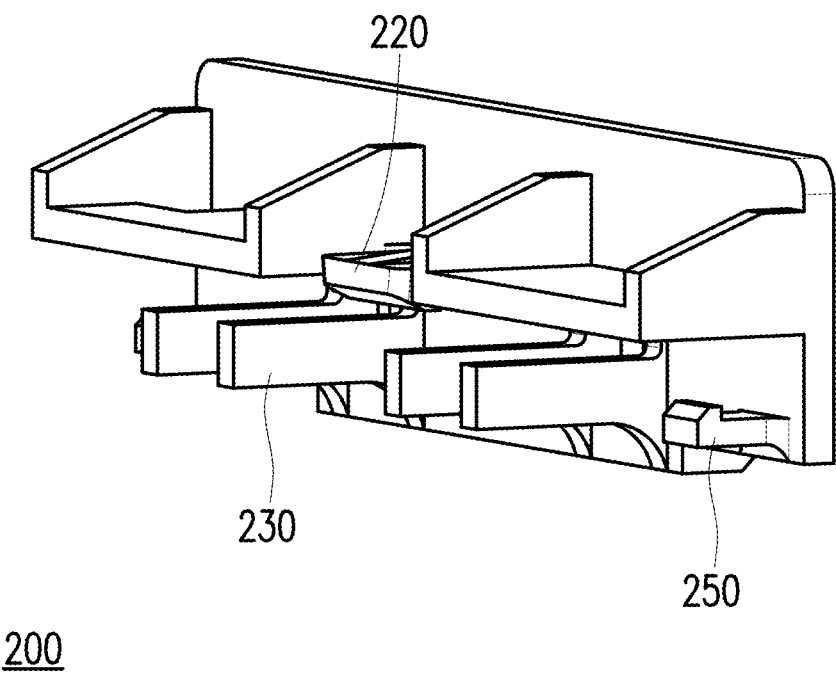
FIG. 9 is a schematic diagram of the antenna bracket of the network communication device in FIG. 7.

FIG. 7 is a schematic diagram of a network communication device of yet another embodiment of the disclosure. FIG. 8 is a schematic diagram of the network communication device in FIG. 7 with the antenna bracket removed. FIG. 9 is a schematic diagram of the antenna bracket of the network communication device in FIG. 7 from another viewing angle. The network communication device 70 in the embodiment of FIG. 7 is substantially the same as the network communication device 50 in the embodiment of FIG. 2, and the differences between the two are mainly described here. Referring to FIG. 7 to FIG. 9, in this embodiment, the antenna bracket 200 further has one or more cable management parts 250. A portion of the signal line 58 is located in the cable management part 250. The cable management part 250 may fix the signal line 58 at a preset position to prevent the signal line 58 from hanging in the air and being easily pulled and damaged. In other embodiments, a cable management part may also be disposed in the antenna bracket 100 of FIG. 1 to FIG. 3. In this embodiment, the antenna 72 has two buckle holes 72A and two limiting structures 72B. As shown in FIG. 8, the limiting structure 72B may be the sides of the two narrow slots on the antenna 72. In contrast, the antenna bracket 200 has two antenna hooks 212 and two limiting structures 214. The limiting structure 214 is a rib, which may block the movement of the antenna 72 in the lateral direction. The antenna hook 212 is configured to buckle into the second buckle hole 72A. The limiting structure 72B is combined with the limiting structure 214 to limit the lateral movement of the antenna 72 in the antenna slot 210, and may also guide the antenna 72 to be inserted into the antenna slot 210 from a preset position. In addition, the circuit board 54 is firmly clamped between the circuit board hook 220 and the opposite supporting part 230.

Figure 10:
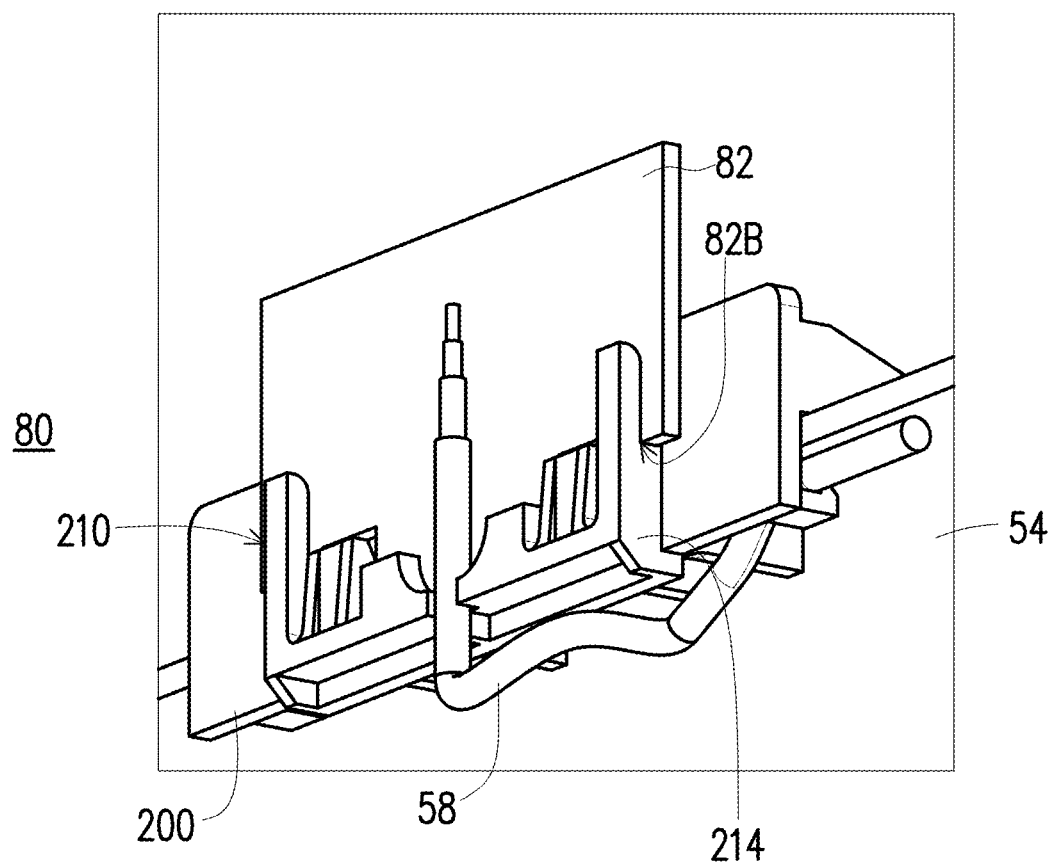
FIG. 10 is a schematic diagram of a network communication device of yet another embodiment of the disclosure.

FIG. 10 is a schematic diagram of a network communication device of yet another embodiment of the disclosure. The network communication device 80 of the embodiment of FIG. 10 is substantially the same as the network communication device 70 in the embodiment of FIG. 7. The main difference is that the width of the antenna 82 in the embodiment of FIG. 10 is less than the width of the antenna 72 of FIG. 7. Referring to FIG. 10, the limiting structure 82B of the antenna 82 is a side of the antenna 82 adjacent to the second limiting structure 214 (the limiting structure 82B in FIG. 10 is covered inside the second limiting structure 214). When the antenna 82 is placed into the antenna slot 210, the side of the antenna 82 serving as the limiting structure 82B rests against the limiting structure 214.

Figure 11:
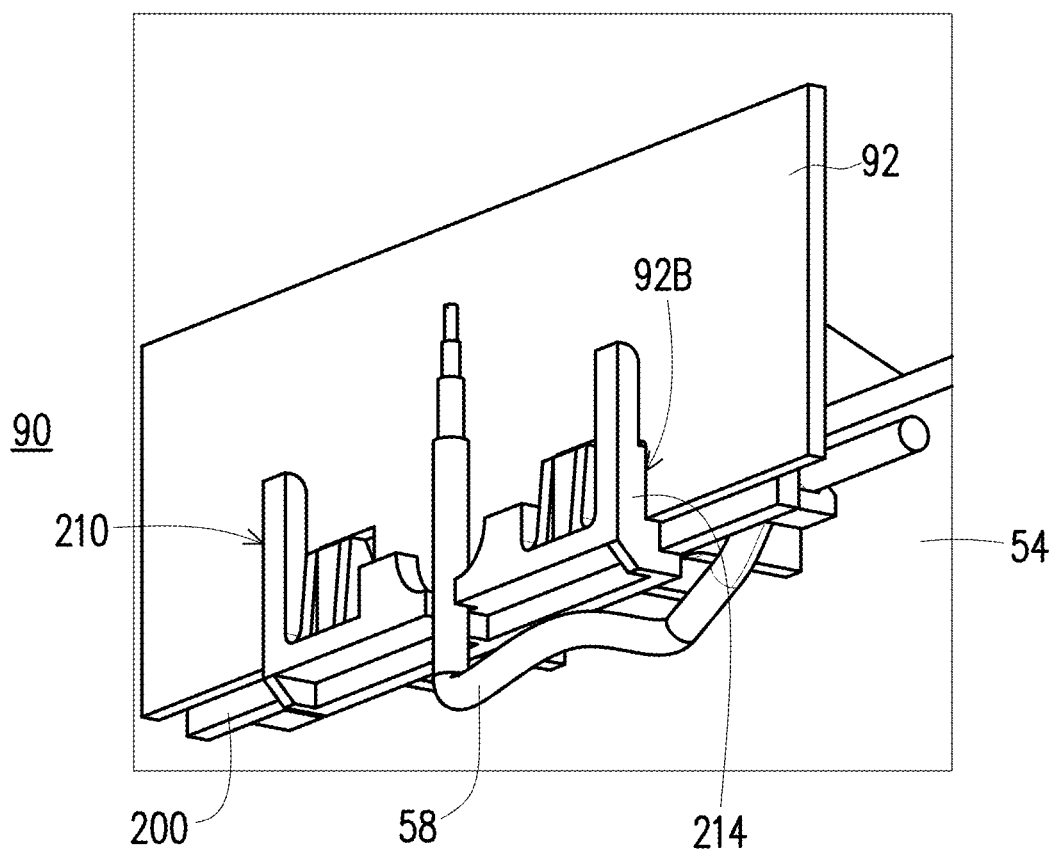
FIG. 11 is a schematic diagram of a network communication device of yet another embodiment of the disclosure.

FIG. 11 is a schematic diagram of a network communication device of yet another embodiment of the disclosure. The network communication device 90 of the embodiment of FIG. 11 is substantially the same as the network communication device 70 in the embodiment of FIG. 7. The only difference is that the width of the antenna 92 in the embodiment of FIG. 11 is greater than the width of the antenna 72 of FIG. 7. Referring to FIG. 11, when the antenna 92 is placed into the antenna slot 210, the limiting structure 92B is combined with the limiting structure 214. The limiting structure 92B of the antenna 92 is a side of the antenna 92 adjacent to the second limiting structure 214 (the limiting structure 92B in FIG. 11 is covered inside the second limiting structure 214). It may be known from FIG. 7, FIG. 10, and FIG. 11 that the same antenna bracket 200 may be configured to carry antennas of multiple different sizes, which facilitates in increasing the flexibility of the design, so that the network communication device may be configured with more types of antennas, thereby enhancing communication performance and reducing the size of the network communication device.

To sum up, in the antenna bracket and network device of the disclosure, the circuit board hook and the opposite supporting part jointly clamp the circuit board, eliminating the need for large buckle holes. This design occupies less space on the circuit board while maintaining a robust structure, thereby preserving greater layout space and allowing for a reduction in the overall size of the network communication device. Moreover, since there is no need to preserve space for assembly between the circuit board hook and the circuit board buckle hole, the antenna may be securely fixed through the buckling of the circuit board hook and the buckle hole, thereby minimizing wobbling and providing stable signal reception capabilities.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. An antenna bracket, configured to assemble to a circuit board and carry an antenna, the antenna bracket having a first antenna slot, a circuit board slot, a circuit board hook, and an opposite supporting part, wherein the first antenna slot is configured to carry the antenna; wherein the antenna bracket is assembled to an edge of the circuit board, the circuit board hook and the opposite supporting part are respectively located on opposing first surface and second surface of the circuit board; wherein the circuit board slot is located between the circuit board hook and the opposite supporting part to accommodate the circuit board; and wherein the circuit board hook is buckled to a first buckle hole of the circuit board.

2. The antenna bracket according to claim 1, wherein in response to the first antenna slot carrying the antenna, the antenna in the first antenna slot is parallel to the circuit board.

3. The antenna bracket according to claim 1, the antenna bracket further having a second antenna slot, wherein the second antenna slot is configured to carry the antenna, in response to the second antenna slot carrying the antenna, the antenna in the second antenna slot is perpendicular to the circuit board.

4. The antenna bracket according to claim 1, wherein the antenna in the first antenna slot is perpendicular to the circuit board.

5. The antenna bracket according to claim 1, wherein the antenna is placed into the first antenna slot along a first direction, the antenna has a first limiting structure, the first antenna slot has a second limiting structure, the first limiting structure is combined with the second limiting structure to limit movement of the antenna in the first antenna slot in a second direction, the first direction is perpendicular to the second direction.

6. The antenna bracket according to claim 1, the antenna bracket further having a cable management part connected wherein a portion of the signal line connected to the antenna is located in the cable management part.

7. The antenna bracket according to claim 1, the first antenna slot having an antenna hook configured to be buckled to a second buckle hole of the antenna.

8. A network communication device, comprising:
a circuit board;
a network communication chip, disposed on the circuit board;
an antenna;
a signal line, electrically connecting the antenna and the circuit board; and
an antenna bracket, assembled to an edge of the circuit board, wherein the antenna bracket has a first antenna slot, a circuit board slot, a circuit board hook, and an opposite supporting part, the first antenna slot is configured to carry the antenna, the circuit board hook and the opposite supporting part are respectively located on opposing first surface and second surface of the circuit board, the circuit board slot is located between the circuit board hook and the opposite supporting part to accommodate the circuit board, and the circuit board hook is buckled to a first buckle hole of the circuit board.

9. The network communication device according to claim 8, wherein in response to the first antenna slot carrying the antenna, the antenna in the first antenna slot is parallel to the circuit board.

10. The network communication device according to claim 8, the antenna bracket further having a second antenna slot, wherein the second antenna slot is configured to carry the antenna, in response to the second antenna slot carrying the antenna, the antenna in the second antenna slot is perpendicular to the circuit board.

11. The network communication device according to claim 8, wherein the antenna in the first antenna slot is perpendicular to the circuit board.

12. The network communication device according to claim 8, wherein the antenna is placed into the first antenna slot along a first direction, the antenna has a first limiting structure, the first antenna slot has a second limiting structure, the first limiting structure is combined with the second limiting structure to limit movement of the antenna in the first antenna slot in a second direction, the first direction is perpendicular to the second direction.

13. The network communication device according to claim 8, the antenna bracket further having a cable management part, wherein a portion of the signal line is located in the cable management part.

14. The network communication device according to claim 8, the first antenna slot having an antenna hook that is buckled to a second buckle hole of the antenna.

* * * * *